June 29, 1965     O. T. ADAMEC     3,192,133
DEVICES FOR SOLAR DISTILLATION

Filed Aug. 27, 1958     4 Sheets-Sheet 1

INVENTOR:
OSWALD T. ADAMEC

INVENTOR:
OSWALD T. ADAMEC

United States Patent Office 3,192,133
Patented June 29, 1965

3,192,133
DEVICES FOR SOLAR DISTILLATION
Oswald T. Adamec, Mount Vernon, N.Y.
(32 Union Square, New York 3, N.Y.)
Filed Aug. 27, 1958, Ser. No. 757,595
12 Claims. (Cl. 202—234)

This invention relates to a process of distillation adapted for desalting sea water, and apparatus therefore, in which the latent heat of evaporation is utilized.

An object of the invention is to provide a desalting process, and apparatus therefor, wherein solar energy is utilized, with economy, and under conditions where automation is possible.

Another object of the invention is to provide a process and apparatus which, although specifically adapted for the separation of salt and impurities from sea water, are readily adaptable for use in the separation of other chemicals from liquids.

Another object of the invention is to provide a process and apparatus utilizing simple mechanical and electrical means for the production of large quantities of fresh potable water from sources of large quantities of salt water by means of solar energy, wherein successive evaporation units are utilized.

Another object of the invention is to provide simple and effective means for carrying out the steps of the process.

Another object of the invention is to utilize the natural energies not only of the sun, but also of the winds, to accomplish the evaporation and condensation of sea water to produce potable water.

Another object of the invention is to provide a solar apparatus for effecting the process involved wherein large areas, normally available for other purposes such, for instance, as roadways and airport landing strips, are utilized for absorbing the heat energy of the sun and applying that energy for carrying out various steps of evaporation, separation of impurities, and condensation of potable water. For instance, the asphalt top surface of a landing field for aircraft, a roadway, or such other means may be utilized to absorb heat energy from the rays of the sun.

Another object of the invention is to provide a process, and apparatus for its effectuation, which reduces to a minimum the need for manpower, and wherein, to a great extent, all phases may be automatically controlled even to the point that an entire plant may be supervised by a single man.

Another object of the invention is the utilization, in the progressive steps, of heat which ordinarily would be wasted in the atmosphere and from the condenser, but is used herein to raise the temperature of water fed to the apparatus and then the latent heat of evaporation is utilized by spraying the feed water on the under side of the asphalt and stone concrete heated surface, and thus maximum efficiency is obtained by absorbing the heat before it is lost to the atmosphere.

For the attainment of these objects, and such other objects as will hereinafter appear, or be pointed out, an embodiment of the invention, and the process involved, are illustrated on the drawings, wherein.

Figure 1:
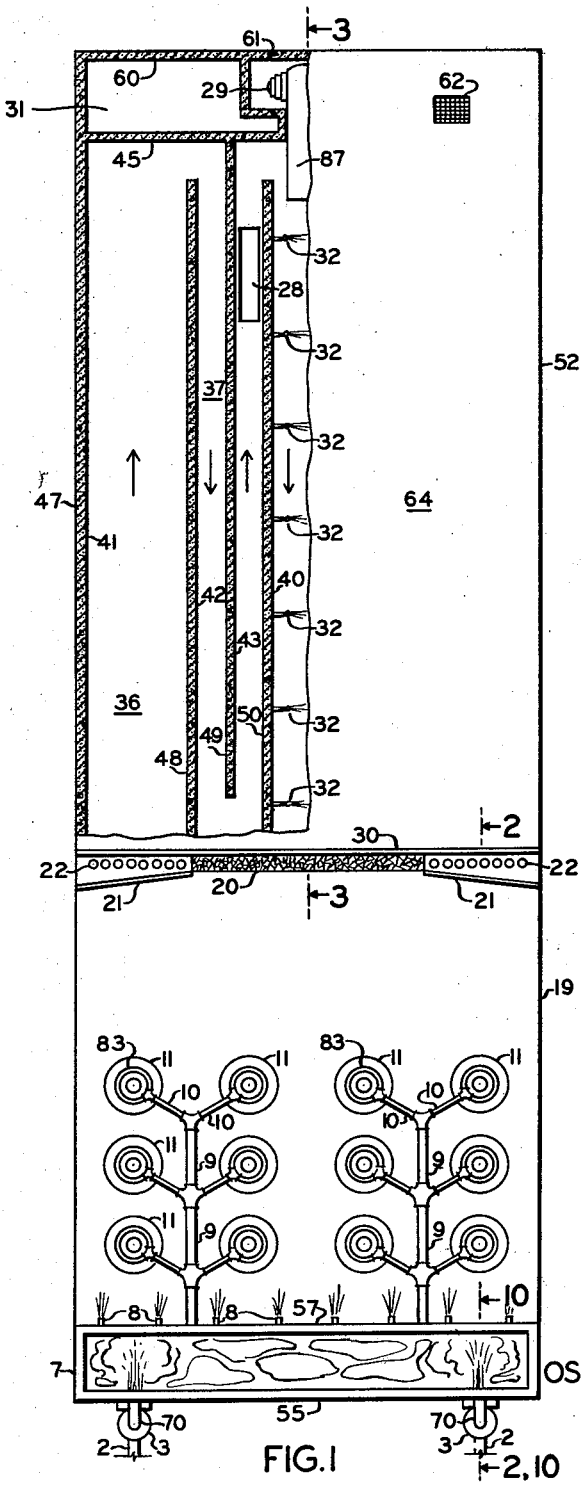
FIG. 1 is a top plan view of a solar distillation apparatus embodying features of the invention, a portion of the structural slab covering the top portion of the heating and vaporization unit being broken away to show part of the interior construction of the unit.
Figure 2:
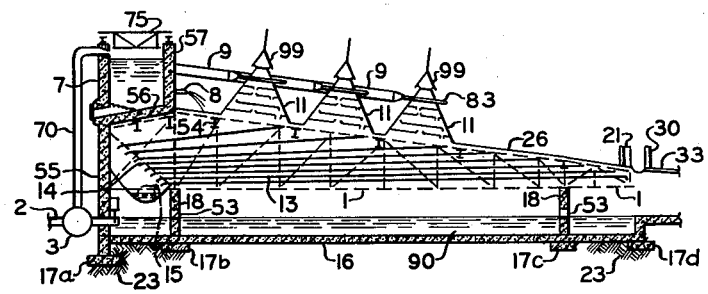
FIG. 2 is a partial vertical sectional view, taken substantially on the line 2—2 of FIG. 1.
Figure 3:
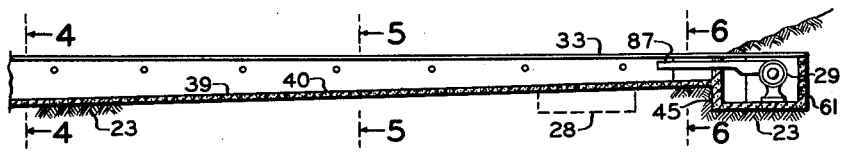
FIG. 3 is a partial vertical sectional view, taken substantially on the line 3—3 of FIG. 1.
Figure 4:
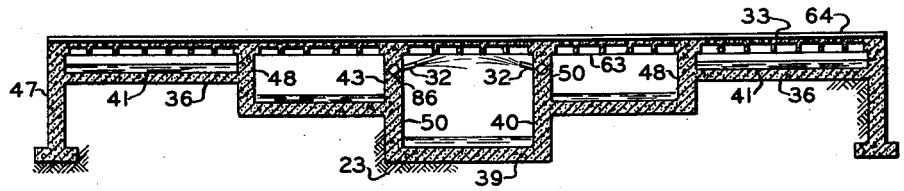
Figure 5:
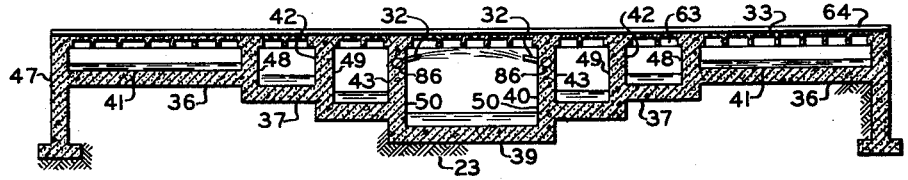
Figure 6:
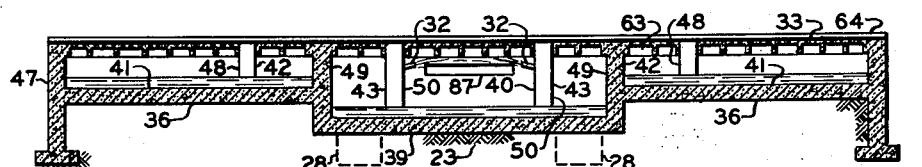
Figure 7:
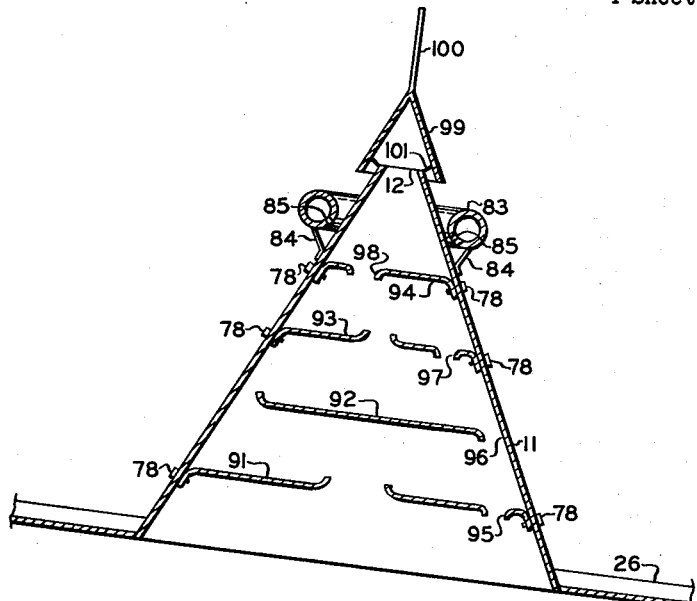
Figure 8:
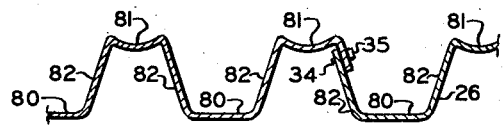
Figure 9:
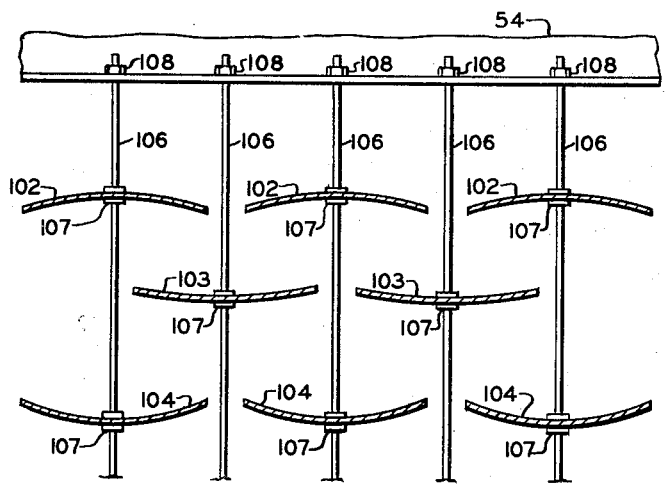
Figure 10:
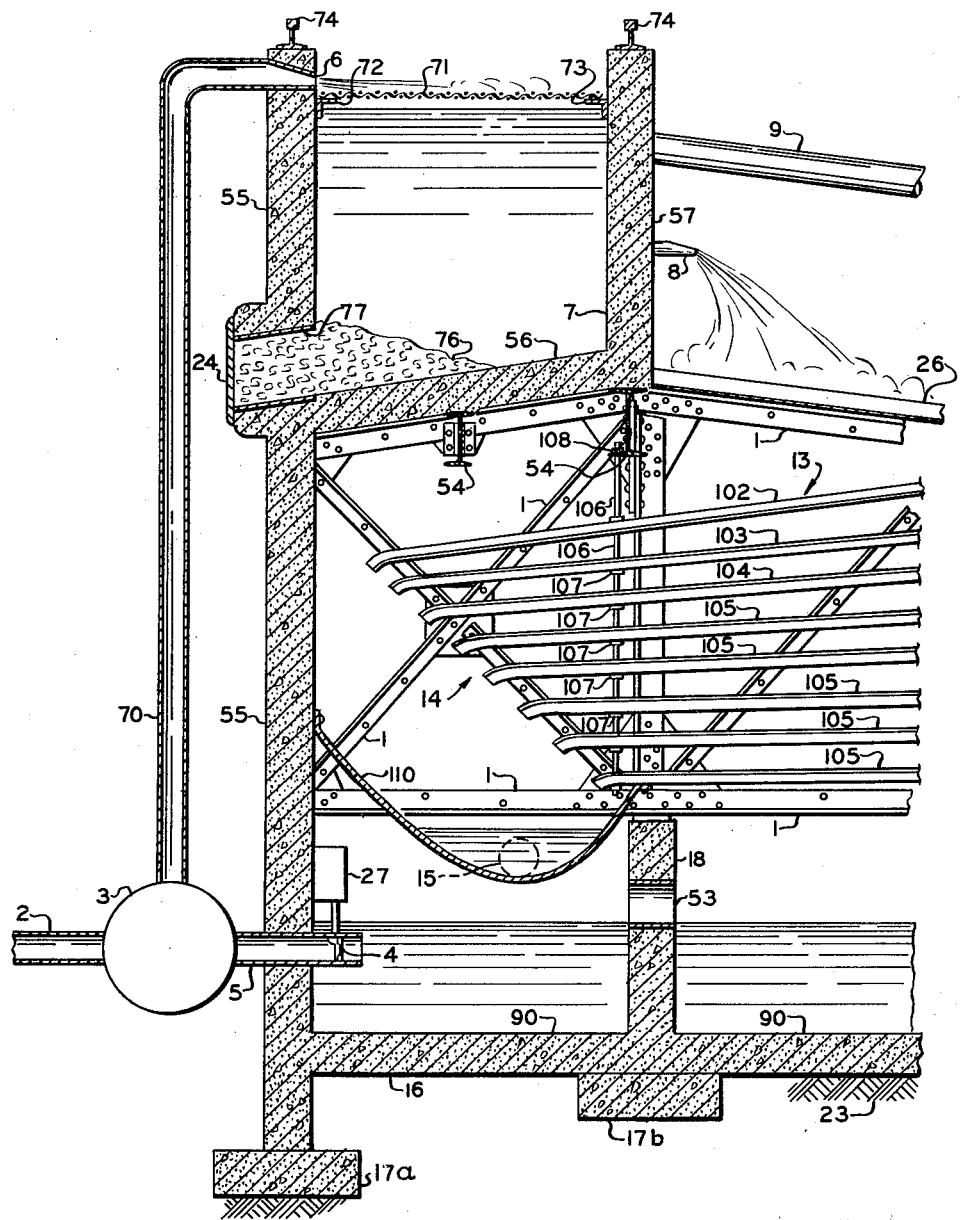

FIGS. 4, 5 and 6 are vertical cross-sectional views, taken substantially through the heating and vaporization unit on lines 4—4, 5—5 and 6—6, respectively, of FIG. 3;

FIG. 7 is a vertical sectional view, taken through a condensing cone and vent;

FIG. 8 is a cross-sectional view, taken through the metal decking of the condensing unit, and showing its construction;

FIG. 9 is a cross-sectional view through the condensing and collecting baffles of the condensing unit; and FIG. 10 is an enlarged vertical sectional view, taken substantially on the line 10—10 of FIG. 1.

The total capacity of each unit embodying the invention may be adjusted by increasing or decreasing the various effective areas in proportion to the layout shown in FIG. 1. A recommended capacity in fresh water produced by a single unit to be described is taken to be 100,000 gallons per day. Additional units may be added adjacent to each other, forming a substantially continuous apparatus. A single main fresh water conduit may connect with the other units to carry the fresh water to a common reservoir.

Referring to FIG. 1, the lower end of the drawing is intended to depict that part of the invention which serves as a condensing unit. The upper end is intended to illustrate the heating and vaporizing unit. The process of desalting sea water starts with the main feed pipes 2 from the sea. Feed pipes 2 may be arranged to feed to the apparatus by gravity. The delivery rates are more easily controlled and are more readily adaptable and efficient, if centrifugal pumps 3 are used. The salt water, by means of risers 70 and pumps 3, is discharged through nozzles 6 over a screen 71, to fall into a reservoir 7. Reservoir 7 is located at the end of the structure defined by wall 55. The reservoir also includes a wall 57, and is located at the top of the condensing unit. In the reservoir, the salt water warms up approximately to the same temperature as that of the surrounding air. The top of each reservoir has a heavy screen 71, which is supported on angle irons 72 and 73, to remove any solid materials such as plant life and debris. A mechanical, broom-like, cleaning device 75, rolling on wheels over rails 74 along the top of the reservoir, may be used to remove the debris from the screen. The bottom 56 of the reservoir is sloping to permit the sand or other solid material to settle in the trap which is opened by an automatic gate 24, thereby allowing the sand to fall back into the sea.

The water flows from reservoir 7 through a series of perforated cast-iron pipes 8 and 9, by gravity, and is sprayed over roof decking 26 of the condensing unit 19, and cones 11 by means of spray rings 83. The sun and wind cause evaporation of this water; this cooling, combined with direct transfer to the water flowing over the roof and the cones, removes heat from the condensing unit 19. By this stage in the process, the temperature of the water flowing over the condenser roof is raised. This water flows over the roof by gravity, and is directed by baffle 21 to a limestone bed 20 from which it flows to and through openings 22 in the top surface of a slab type vaporizing unit 52. That surface is an asphalt layer 64. Openings 22 extend through the layer to the interior of the slab. Openings 22 are protected by a shaker screen against clogging, and against entrance of vermin into the system. Concrete wall 30 prevents sea water from spreading out over the heating area, including the asphalt layer 64. The limestone in the bed, which is the only raw material required, is replaced after an extended period of time.

The water from bed 20 then flows from the limestone into and through the vaporizing unit along a path as indicated by the directional arrows. The heating or vaporizing chamber 52 is divided longitudinally into seven sections 41, 42 and 43, defined by end wall 45, side walls 47, partitions 48, 49 and 50, and bottoms 36, 37 and 39 which slope in successive stages from bed 20, finally through centrally located chamber 40, to reservoir 90. The salt water is fed by gravity from one section to another, finally reaching the center section. Gear pumps (not shown) pick up water from pump pits 28. The water is then sprayed upon the under side of the roof of chamber 52, as provided by the asphalt and cored concrete slab 33, by passing from the pumps through ducts 86 in the wall of the slab and then through nozzles 32. The under side of chamber 52 may be formed by a plurality of ribs, as by coring. The water, thus sprayed, absorbs and accumulates the heat of the sun as that heat is transmitted through the thickness of the asphalt layer 64 and the stone concrete from its upper surface. The asphalt of layer 64 used may contain approximately forty (40%) percent mineral content, to increase its thermal conductivity. By spraying the water against the under face of the roof defined by the slab and the asphalt layer, the absorption of heat is increased. That part of the water which is vaporized is blown by air, which may be moved by suitable means such as a squirrel cage blower 29, through a tuyere 87, and into the condensing chamber.

The water which is not vaporized may then be recirculated to reservoir 7 on the roof of condensing unit 19. The water is picked up by pump 3 through opening 5 which may be controlled by a check valve 4 and an automatic float 27.

The vaporized fresh water is carried up through the condenser by movement induced both naturally and from the blown air, the natural draft arising as the air moves through vents 12 at the top of each condensing cone 11. The condensing apparatus, cooling by both wind and water flow, as previously described, condenses moisture from the moving air stream. The fresh water condensed from the vapor collects, and trickles off baffles 13 and 14, to flow by gravity to main conduit 15 leading to the fresh water reservoir.

Baffles 13 and 14 may comprise deflector baffles 102 from which moisture drips upon conducting baffles 103, and then to the next conducting baffles 104, and then to other conducting baffles 105. All of this moisture is conducted to trough 110. Baffles 102, 103 and 104 may be supported from girders 54 by hangers 106 on which they are held in place by suitable leakageproof fittings 107. The hangers may be held by nuts 108.

The entire condensing unit is supported by a series of copper-bearing steel trusses 1 spaced about twenty-five to thirty feet apart, the trusses being supported on walls 18 having passages 53 formed therethrough for communication of the various parts of the reservoir.

All concrete constructions 16, including fittings 17a, 17b, 17c and 17d, must be designed and insulated, as at 23, to suit the geographical location of the desalting plant. Similarly, the utility to which the asphalt heating area will be put will determine the size of concrete slab and the spacing of the intermediate supports properly to transmit the stresses to the ground. This extremely large asphalt paved area 27 is quite suitable as an aircraft landing strip. Natural rainfall falling on top of slab 33 on this area may pass down its slope and through grills 62, to be collected into two reservoirs 31, bounded by walls 45 and 60, and separated by an area 61 in which blower 29 may be housed. The rain water then may be pumped to a main reservoir for sanitary or irrigation purposes.

Referring to FIGS. 7 and 9, there is illustrated a design for decking 26 which may be carried by girders 54 and span 20 to, say, thirty feet between supporting steel, and at the same time have a shape which will direct the flow of the cooling and evaporating water properly on its top surfaces, and condensing air to its inner surfaces. It is made up in sections 34 and caulked and connected by self-tapping screws 35. The sections have flat-bottomed channels 80 and upper channels 81, connected together by screws 35. Channels 81 overflow down the sloping sides 82 of channels 80.

FIG. 10 illustrates, in enlarged section, the structure of collecting and condensing baffles 13. FIG. 7 illustrates the structure of condensing cones 11. All of these parts may be made of non-rusting sheet metal, such as stainless steel, aluminum, or the like.

Cones 11 comprise baffles 91, 92, 93 and 94, with openings 95, 96, 97 and 98. Vents 12 are topped by vent caps 99 which may serve as lightning rods 100. The caps may be held to the cones by means such as wire mesh 101. The baffles may be secured to the body of the cones by bolts 78.

What is claimed as new and useful is:

1. A structural slab for transmitting solar energy therethrough comprising a cored slab, a thin layer of asphalt with a high mineral content to increase the thermal conductivity of said asphalt, said layer of asphalt being spread on top of said slab for absorbing solar energy and transmitting heat to said cored slab, the coring of said slab providing interconnected substantially parallel passages and a plurality of rib portions in the slab, the passages being connected at their ends to provide a continuously downwardly sloping surface extending back and forth through the slab, and the slab having areas of reduced thickness between the rib portions, the rib portions being formed below the asphalt layer and extending downwardly from walls of the passages and into the passages.

2. A solar distillation apparatus comprising a sloping deck, means for spraying water at the high end of the deck, a monolithic member having a substantially level outer surface capable of utilization for purposes such as a roadway or airport landing strip, the outer surface being exposed to solar heat, the member having a plurality of substantially parallel passages extending longitudinally through the member, the member being of a thickness between said outer surface and walls of the passage for effective heat conduction, the passages having sloping bottoms, certain of the immediately adjacent passages being connected to each other at their ends so that said sloping bottoms result in a substantially continuous downward incline for gravity feeding of water entering at the high point of the passages, means for conducting water from the low point of the deck to the high point of the sloping bottoms, a reservoir, the member having a sloping duct leading from the sloping bottoms and discharging into the reservoir, means for spraying water delivered at the low point of the sloping bottoms against the top walls of the duct, means for causing air movement through the duct and the sprayed water, means including at least a portion of the deck for acting upon the air moving beyond the duct to condense moisture from the moving air, and means for collecting the condensed moisture.

3. A solar distillation apparatus comprising a condensing chamber having a sloping roof, means for causing a stream of cooling water to flow down and over the roof, a member having a substantially level outer surface capable of utilization for purposes such as a roadway or airport landing strip, the outer surface being exposed to solar heat, the member having a plurality of substantially parallel passages extending longitudinally through the member at a short distance below said outer surface, means for conducting water from the roof to the passages, a reservoir, the passages including a sloping duct discharging into the reservoir, means for spraying water taken from the water conducted through the passages against the top walls of the duct, means for causing air movement through the duct and the sprayed water, means comprising the roof for acting upon the air moving beyond the duct to condense moisture from the moving air, and means for collecting the condensed moisture.

4. A heating and vaporization unit for use with a condensing unit in a solar distillation apparatus, said heating and vaporization unit comprising a concrete structural slab heated by solar radiation, the slab having passages beneath its top surface for movement therethrough of water for heating and vaporization, means for conducting air through the slab in contact with the water moving through the slab, whereby evaporation of water within the passage is effected, and for driving the air and evaporated water into the condensing unit.

5. A solar distillation apparatus for purifying water, comprising, in combination, a lower reservoir, a thin sloping deck over said reservoir and having air vents extending through said deck, means for flowing water in thin sheets over said deck, a heat-absorbent structural slab having a wall including a heat-absorbing surface exposed to the sun, a long substantially enclosed heating chamber within the slab and said chamber sloping downwardly away from said deck, means for conducting water from the deck into and upon the slope of the heating chamber, whereby the water will flow through the chamber down the slope, means for collecting the water after passing through the heating chamber, a vaporization chamber within the slab at least a portion of which vaporization chamber is defined by the underside of said wall, the vaporization chamber having a bottom surface sloping toward said reservoir, means for spraying the collected water toward and against said under side of said wall within said vaporization chamber, means for causing air to move through said vaporization chamber and through the sprayed water, means for directing the air after passage through the spray to move under said deck and through said air vents, whereby moisture is condensed from the air upon the internal faces of the deck and vents, and means between the lower reservoir and the deck for collecting water condensed by the deck and the air vents.

6. A solar distillation apparatus for purifying water comprising, in combination, a lower reservoir, a thin sloping deck over said lower reservoir, baffled water-cooled air vents extending through said deck for condensing water vapor passing therethrough, means to cause water to flow in thin sheets by means of gravitational force over said deck, a solar heat absorbent structural slab providing a top wall having an exposed heat-absorbent surface, the slab having a long downwardly sloping heating passage provided beneath said wall, means for conducting water from said deck to said passage, whereby the water will flow through the passage, means for collecting the water after flowing through said passage, a vaporization chamber forming the end portion of the passage within the slab and having a surface sloping downwardly toward said reservoir, the wall providing a boundary for the vaporization chamber and having rib portions extending downwardly therefrom into the vaporization chamber, the wall having portions of reduced thickness between said rib portions, a thin layer of asphalt over said wall for absorbing solar heat energy and transmitting heat through said rib portions and said reduced area portions to heat said passage and said chamber, means to spray water collected at the end of said passage on to the other side of said wall, whereby the transmission of heat to the water in said vaporization chamber and the formation of water vapor is accelerated, means for forcing air through said vaporization chamber to absorb said water vapor and form moisture-laden air, said forcing means cooperating with the vaporization chamber to move the moisture-laden air into the area under said deck and through said air vents, whereby moisture will be condensed from said moisture-laden air by the deck and the air vents, and collection baffles between said lower reservoir and said deck to collect the condensed water.

7. A heating and vaporization unit as set forth in claim 4, wherein a thin layer of solar energy absorbent material is positioned on top of said structural slab for increasing its solar energy absorption and transmission.

8. Apparatus as set forth in claim 6, wherein means are provided to cause water from said lower reservoir to recirculate by adding it to the water flowing over said deck.

9. A solar distillation apparatus as set forth in claim 5, wherein said deck comprises sheet metal having longitudinal corrugations, the corrugations having sloping side surfaces and bottom surfaces to form lower channels between the corrugations, and concave upper surfaces between said sloping surfaces to form upper channels.

10. The apparatus as set forth in claim 5, wherein each of said air vents comprises a sheet metal cone having an opening in its upper end for the passage of air therethrough, an apertured spray ring around the upper part of the cone and below the opening to direct water over the outer surface of said cone, alternating baffles in the cone for causing air moving through the cone to follow a devious path and to be forced into contact with the inner surface of said cone, said baffles providing means for draining condensate counter to the air flow.

11. A solar distillation apparatus as set forth in claim 5, wherein said slab comprises concrete having rib portions, an area of reduced thickness between said rib portions, and a thin layer of solar energy-absorbent material spread on the top of said slab for raising the rate of heat-absorption of said reduced thickness areas to heat said vaporization chamber and said heating chamber.

12. A solar distillation apparatus as set forth in claim 11, wherein said concrete is of high mineral content to increase the heat conductivity of the slab.

References Cited by the Examiner

UNITED STATES PATENTS

| | | | |
|---|---|---|---|
| 53,438 | 3/66 | Gleason | 159—15 |
| 85,160 | 12/68 | Arnold | 159—15 |
| 188,645 | 3/77 | Lee | 94—19 |
| 728,392 | 5/03 | Hague. | |
| 983,424 | 2/11 | Brosius. | |
| 986,237 | 3/11 | Miller. | |
| 1,190,968 | 7/16 | Story. | |
| 1,157,633 | 12/24 | Junkers | 29—180 |
| 1,544,029 | 6/25 | Nelson. | |
| 1,916,631 | 7/33 | Muchnic | 94—12 |
| 2,066,656 | 1/37 | Stromberg | 94—3 |
| 2,268,320 | 12/41 | Brandt | 126—270 X |
| 2,386,020 | 10/45 | Wendelken | 94—33 |
| 2,435,034 | 1/48 | Chisholm. | |
| 2,456,562 | 12/48 | Lindsay. | |
| 2,466,150 | 4/49 | Burt | 94—1 X |
| 2,619,453 | 11/52 | Anderson | 202—75 |
| 2,746,365 | 5/56 | Darnielle | 94—33 |
| 2,803,591 | 8/57 | Coanda et al. | 202—234 |
| 2,834,582 | 5/58 | Kablitz. | |
| 2,978,797 | 4/61 | Ekelund. | |

FOREIGN PATENTS

| | | |
|---|---|---|
| 737,909 | 10/53 | Great Britain. |
| 760,517 | 10/56 | Great Britain. |
| 31,994 | 3/21 | Norway. |
| 183,621 | 4/36 | Sweden. |

NORMAN YUDKOFF, *Primary Examiner.*

RICHARD NEVIUS, ALPHONSO SULLIVAN, MILTON STERNMAN, GEORGE D. MITCHELL,
*Examiners.*